Patented May 3, 1949

2,469,290

UNITED STATES PATENT OFFICE 2,469,290

PROCESS FOR MAKING TETRACHLORODI-FLUOROETHANE

John D. Calfee, Manhassett, and Patrick A. Florio, Brooklyn, N. Y., assignors to Allied Chemical & Dye Corporation, a corporation of New York No Drawing. Application March 19, 1946, Serial No. 655,594

4 Claims. (Cl. 204—163)

This invention relates to manufacture of tetrachlorodifluoroethane, i. e., 1,1-difluoro-1,2,2,2-tetrachloroethane, $CCl_3CF_2Cl$ (M. P. 42° C., B. P. 91.8° C.), a material which is especially useful as a solvent and as a chemical intermediate, and which is substantially less toxic than the related alkyl chlorides. The present improvements are directed particularly to production of tetrachlorodifluoroethane from ethylidene fluoride, $CH_3CHF_2$, a readily available raw material.

A mixture of ethylidene fluoride and sufficient chlorine to effect complete substitution of all of the hydrogen atoms by chlorine may be heated by extraneous heat to relatively high temperatures to effect chlorination and formation of tetrachlorodifluoroethane. Such a direct thermal chlorination operation in which chlorination is effected by heat alone, while not ordinarily objectionable in chlorination procedures in general, in the particular reactions to which this invention relates possesses the marked commercial disadvantage that at the outset of heating, competing reactions take place with the result that HF splits out of the ethylidene fluoride. Further, aside from loss of the HF, it is not possible to get good yields of the desired product because of the various side reactions inherently effected.

The principal object of this invention is provision of one-step photochemical and thermal processes to which it is possible to prepare tetrachlorodifluoroethane at high rates of production by exhaustive chlorination of ethylidene fluoride to give good yields of tetrachlorodifluoroethane, but without so-called chlorinolysis (disunion of carbon atoms by the action of chlorine), without substantial loss of HF, and without giving rise to formation of excessive quantities of undesired by-products.

In accordance with the invention, it has been found that the foregoing object may be accomplished by subjecting a mixture of ethylidene fluoride and chlorine to the simultaneous action of actinic radiation and heat at temperature not less than 400° C. and not more than 550° C., and recovering tetrachlorodifluoroethane from the resulting reaction product.

The reaction effected may be represented by the equation—

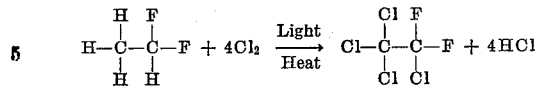

The reaction may be carried out conveniently by passing the starting materials into and thru a glass enclosed reaction space subjected to the action of light and heat. Provided proper temperatures are maintained, any form of light which effects chemical reaction may be employed, such as infra-red rays, ultra violet rays, ordinary incandescent lamps, fluorescent light, or high wattage drying lamps. Commercial lamps (e. g. 115 volt, 250 watt, initial maximum beam candle power of about 16,000) having a spot reflector and a high infra-red emission are practical since such equipment furnishes both light and heat, and facilitates temperature control. While heat may be derived from the same energy as the light, necessary reaction temperatures may be obtained from extraneous heat, or from a combination of extraneous heat and heat from the source of light.

The process is readily adaptable to a continuous operation in which the ethylidene fluoride and chlorine are continuously introduced into a reaction zone, subjected therein to the simultaneous action of actinic radiation and heat, and the resulting reaction mixture continuously discharged from the reaction zone.

Good conversion of ethylidene fluoride and good yields of tetrachlorodifluoroethane depend upon the ethylidene fluoride to chlorine mol ratio, temperature of the reaction, light intensity, space velocity per hour (volumes of reactant gas at room temperature per volume of reaction chamber per hour), and the substantial absence of oxygen in the reaction mixture. The term "conversion" indicates the percentage by weight of starting material which reacts during the course of the reaction, and the term "yield" denotes the percentage by weight of ethylidene fluoride input which is recovered as the desired end product.

In usual operation, chlorine should be employed in quantities not less than 4 molecular proportions per mol of ethylidene fluoride. Lesser proportions of chlorine may be fed into the reaction chamber, but to no advantage since conversion of ethylidene fluoride would be correspondingly reduced. An excess of chlorine is preferable, and it has been found that relative to the amount of chlorine employed, best results are obtained when there is introduced into the reaction zone not less than about 4.5 molecular proportions of chlorine per mol of ethylidene fluoride.

In accordance with the invention, it has been found that in order to satisfactorily carry out the present one-step photochemical and thermal process and obtain substantial exhaustive chlorination, temperatures in the reactor should be maintained not less than 400° C. and not more than 550° C. We find that in order to make effective the conjunctive use of actinic radiation and heat and put the reaction on a one-step basis, temperatures in the reaction chamber should be maintained at not less than 400° C. Temperatures of about 550° C. should not be exceeded in order to prevent appreciable chlorinolysis. As to temperature control it has been found that best conversion and yields are secured when temperatures in the reactor are held within the range of about 450–475° C.

The reaction proceeds in the presence of any reasonable amount of actinic radiation, although the speed of reaction appears to be fairly proportional to the intensity of light, good results having been obtained when both light and heat emanate from the same source of electrical energy, in which instance light intensity is high.

In the better modes of operation, space velocity per hour should be not more than 250, and is preferably in the range of 75 to 150. Oxygen inhibits the chlorination reaction, and in practice the process is carried out under conditions such that the reaction is effected in the presence of less than 0.1% by weight of oxygen based on the amount of ethylidene fluoride charged.

The exit gas of the reactor contains HCl, some chlorine, tetrachlorodifluoroethane, smaller amounts of materials such as trichlorodifluoroethane, boiling at about 72° C., and trace quantities of other chlorinated derivatives of ethylidene fluoride.

To recover the desired 1,1-difluoro-1,2,2,2-tetrachloroethane product, the effluent of the reactor may be fed into a water scrubber in the bottom of which the tetrachlorodifluoroethane and usually small amounts of not so highly chlorinated ethylidene fluoride collect as an oil or a solid depending upon temperature conditions in the scrubber. The supernatant water dissolves HCl, and any excess chlorine which may have been present passes thru the water scrubber. After separation from the water in the scrubber, the collected mass may be washed with a mild caustic solution to remove last traces of HCl and chlorine. The resulting material may be distilled under suitable conditions to recover the tetrachlorodifluoroethane in the desired state of purity.

Alternatively, the reactor tail gases may be passed into a receiver externally packed in ice. Chlorinated reaction products condense and form a mushy semi-liquid mass comprising tetrachlorodifluoroethane, and small amounts of not so highly chlorinated ethylidene fluoride. The gases exiting the receiver may be scrubbed with water in which chlorinated products still contained in the gas stream are collected partly as solids and partly as a heavy oil. After separation of the mixture of heavy oil and suspended solids from the water by decantation, such mixture may be combined with the mushy semi-liquid mass withdrawn from the receiver. The resulting combined mass may be then washed with dilute alkali to remove chlorine and acidity, and the washed mass distilled under conditions suitable to recover tetrachlorodifluoroethane.

Following is an example of practice of the invention. The all glass reactor used consisted of a 22.5 cm. length of 2.5 cm. O. D. glass tubing opening into a 5.75 cm. O. D. glass tube, 35 cm. long. Provision was made for introducing the reactants at the tip of the smaller tube and for drawing off reaction products at the other end of the apparatus. A glass thermocouple well was fitted into the reactor in order to keep check on internal temperatures. Light and heat were provided by three 115 volt 250 watt drying lamps arranged to distribute light and heat approximately equally over the entire reaction zone. Heat losses were prevented by wrapping the entire apparatus in aluminum foil. A mixture of 79 parts by weight of ethylidene fluoride and 602 parts of chlorine (representing a molar ratio of 1:5.2) was passed through the reactor during an 80 minute period. The space velocity per hour was 100 and the temperature was maintained at 455–475° C. The reactor tail gases were passed into an externally ice packed receiver, and 215 parts of reaction product were collected, which product comprised tetrachlorodifluoroethane and some trichlorodifluoroethane. Occluded HCl and chlorine were removed by a light caustic wash. Upon distillation, there were recovered as still residue 197 parts of tetrachlorodifluoroethane boiling in the range of 85–92° C. Yield was 81%.

We claim:

1. The process for preparing tetrachlorodifluoroethane which comprises subjecting a mixture of ethylidene fluoride and not substantially less than 4 molecular proportions of chlorine to the simultaneous action of actinic radiation and heat at a temperature of not less than 400° C. and not more than 550° C. for a period of time sufficient to effect formation of substantial yield of tetrachlorodifluoroethane, and recovering tetrachlorodifluoroethane from the resulting reaction products.

2. The process for preparing tetrachlorodifluoroethane which comprises subjecting a mixture of ethylidene fluoride and not substantially less than 4 molecular proportions of chlorine to the simultaneous action of actinic radiation and heat at a temperature in the range of about 450–475° C. for a period of time sufficient to effect formation of substantial yield of tetrachlorodifluoroethane, and recovering tetrachlorodifluoroethane from the resulting reaction products.

3. The process for preparing tetrachlorodifluoroethane which comprises continuously introducing into a reaction zone ethylidene fluoride and not substantially less than 4 molecular proportions of chlorine, subjecting the mixture of ethylidene fluoride and chlorine in said zone to the simultaneous action of actinic radiation and heat at a temperature of not less than 400° C. and not more than 550° C., passing said mixture through said zone at a rate such as to maintain said ethylidene fluoride and chlorine in said zone for a period of time sufficient to effect formation of substantial yield of tetrachlorodifluoroethane, continuously discharging the resulting reaction products from said zone, and recovering tetrachlorodifluoroethane from said reaction products.

4. The process for preparing tetrachlorodifluoroethane which comprises continuously introducing into a reaction zone ethylidene fluoride and not substantially less than 4.5 molecular proportions of chlorine, passing said ethylidene fluoride and said chlorine through said zone at space velocity in the range of 75-250 per hour while subjecting the mixture of ethylidene fluoride and chlorine in said zone to the simultaneous action of actinic radiation and heat at temperature in the range of about 450-475° C., continuously discharging the resulting reaction products from said zone, and recovering tetrachlorodifluoroethane from said reaction products.

JOHN D. CALFEE.
PATRICK A. FLORIO.

REFERENCES CITED

The following references are of record in the file of this patent:

UNITED STATES PATENTS

| Number | Name | Date |
| --- | --- | --- |
| 2,004,072 | Hass et al. | June 4, 1935 |
| 2,407,246 | Benning et al. | Sept. 10, 1946 |

OTHER REFERENCES

Henne et al., Aliphatic Difluorides, Journal of American Chemical Society, vol. 61, pp. 938-940.

Hass et al., Chlorination of Paraffins, Industrial and Engineering Chemistry, March 1936, pp. 333-339.